Feb. 24, 1948.    H. S. JONES    2,436,720
MEASURING AND CONTROLLING APPARATUS
Filed Feb. 6, 1943    4 Sheets-Sheet 1
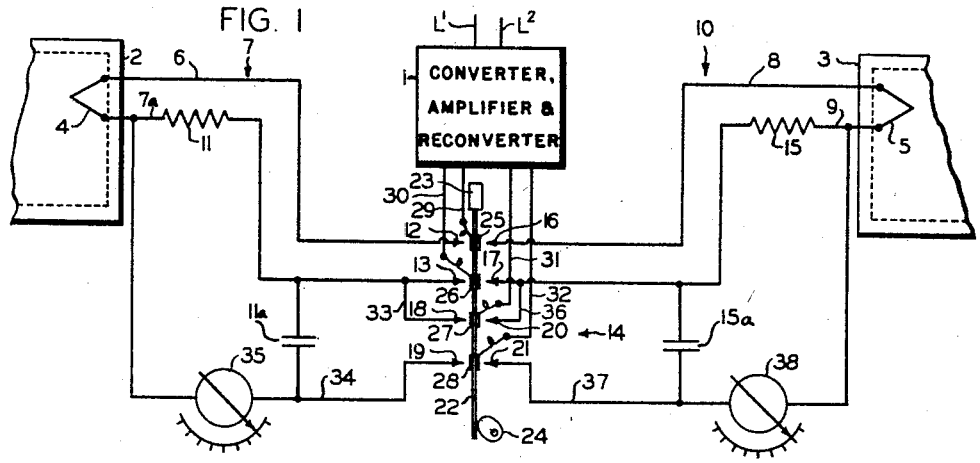
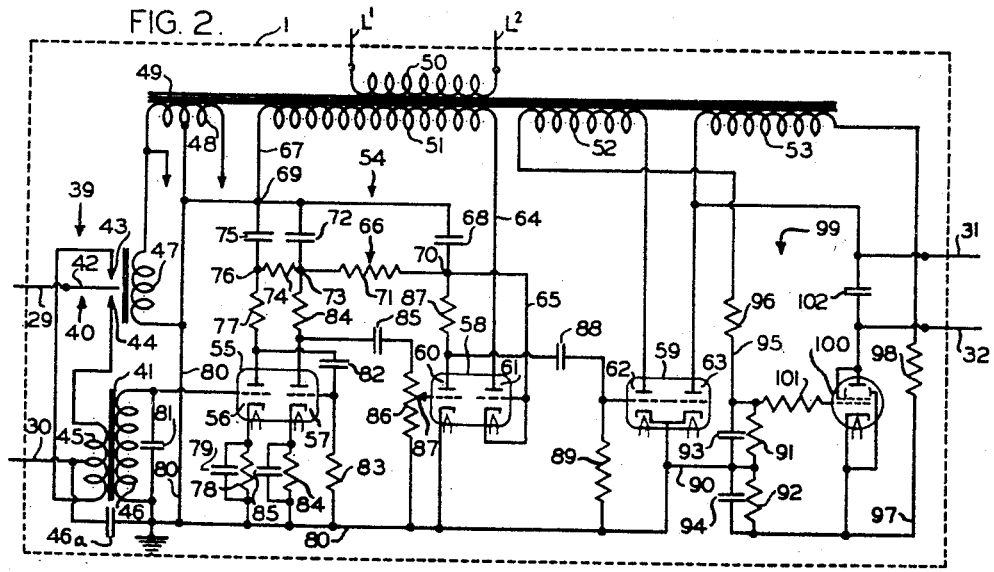
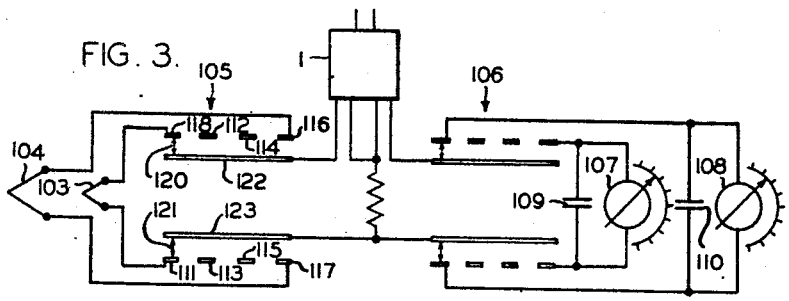
INVENTOR
HARRY S. JONES Feb. 24, 1948.  H. S. JONES  2,436,720
MEASURING AND CONTROLLING APPARATUS
Filed Feb. 6, 1943  4 Sheets-Sheet 2
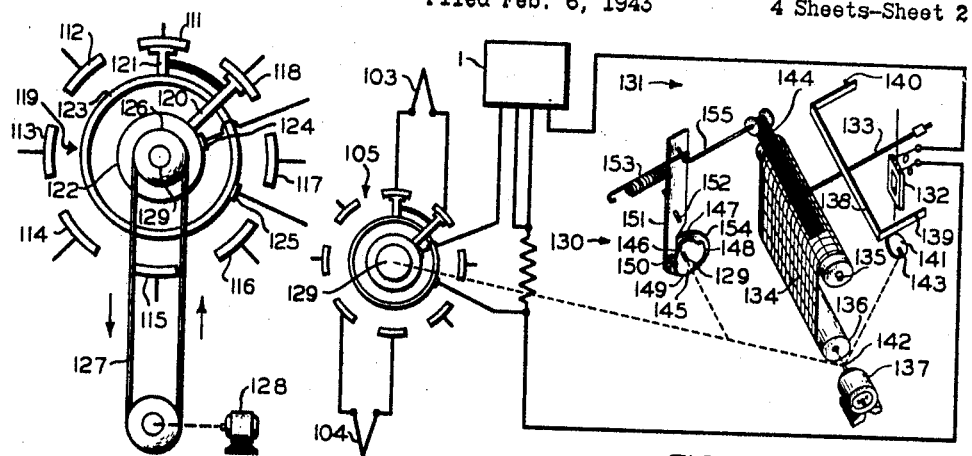
FIG. 4.
FIG. 5.
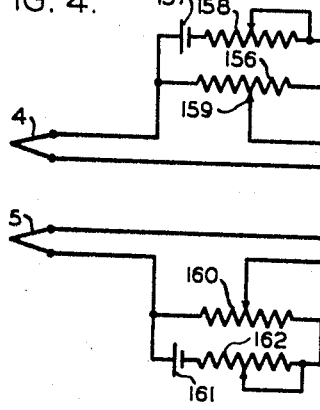
FIG. 6.
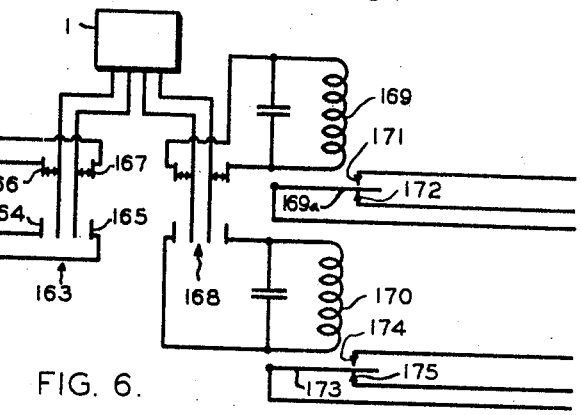
FIG. 7.
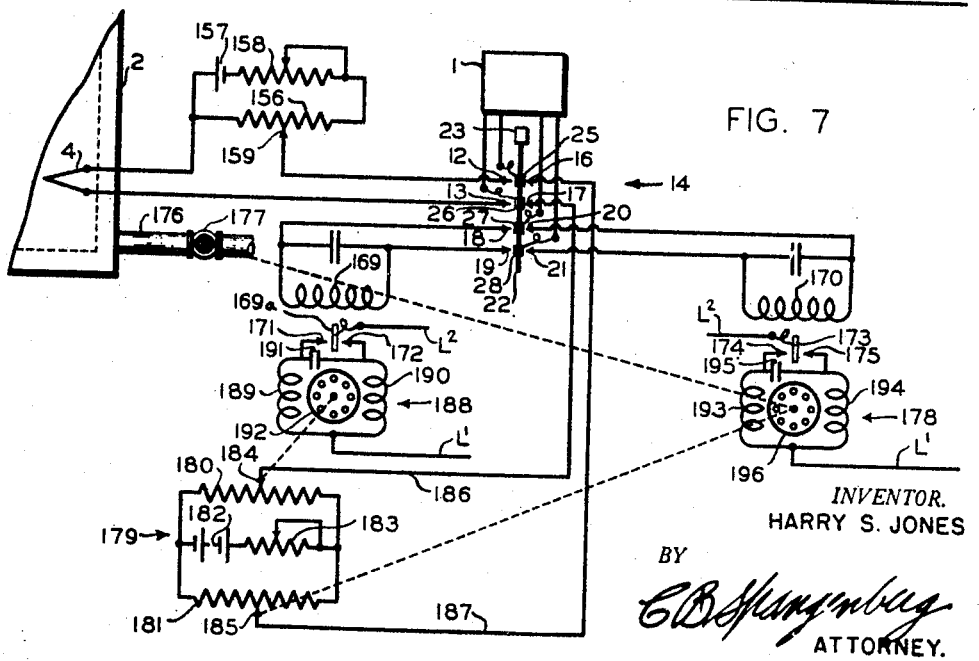
INVENTOR.
HARRY S. JONES
BY
C. B. Spangenberg
ATTORNEY.

Feb. 24, 1948.   H. S. JONES   2,436,720
MEASURING AND CONTROLLING APPARATUS
Filed Feb. 6, 1943   4 Sheets-Sheet 3

INVENTOR.
HARRY S. JONES
BY
ATTORNEY.

INVENTOR.
HARRY S. JONES
BY
G.B. Spangenberg
ATTORNEY.

Patented Feb. 24, 1948

2,436,720

UNITED STATES PATENT OFFICE 2,436,720

MEASURING AND CONTROLLING APPARATUS

Harry S. Jones, Washington, D. C., assignor to The Brown Instrument Company, Philadelphia, Pa., a corporation of Pennsylvania Application February 6, 1943, Serial No. 474,961

22 Claims. (Cl. 236—78)

The present invention relates to apparatus for measuring and/or controlling the magnitude of a variable condition, and more particularly, to high speed apparatus for simultaneously and continuously measuring and/or controlling the magnitude of a plurality of variable conditions.

The invention has particular utility in pyrometric measuring and controlling apparatus which involves measuring the voltage changes of thermocouples, photoelectric cells and the like which are exposed to variations in temperature or radiant energy. The invention is also useful in many other different and varied applications among which may be included measuring and controlling electrolytic conditions of industrial solutions and particularly the determination of hydrogen ion content value of cells wherein it is desired to measure small voltage variations accurately.

A general object of the invention is to provide measuring and/or controlling apparatus for simultaneously and continuously indicating, recording and/or controlling the magnitude of a plurality of variable conditions.

A more specific object of the invention is to provide self-balancing apparatus for simultaneously and continuously measuring and/or controlling the magnitude of a plurality of variable conditions which is characterized in that the condition responsive means does not require the use of any physically movable parts deflecting in correspondence with the variations in the condition being measured and/or controlled, whereby the apparatus is capable of measuring and/or controlling accurately the magnitude of rapidly varying conditions.

A still more specific object of the invention is to provide apparatus which is capable of simultaneously and continuously measuring and/or controlling the magnitude and the changes in magnitude of a plurality of variable conditions substantially instantaneously with the occurrence of such variations.

Another specific object of the invention is to provide measuring apparatus for simultaneously and continuously indicating and/or recording a plurality of potential or current variations of minute magnitude substantially instantaneously with the occurrence of such variations.

A still further specific object of the invention is to provide apparatus for simultaneously measuring and/or utilizing for control and analogous purposes a plurality of minute direct current electromotive forces such as those derived from thermocouples in measuring temperatures.

In accordance with one embodiment of the present invention, an electronic circuit device comprising a converter, an amplifier, and a reconverter is rapidly and successively connected to each of a plurality of sources of unidirectional electrical potential which it is desired to measure simultaneously and to a corresponding instrument associated therewith for indicating and/or recording the magnitude of the source of direct electric potential. The electronic device is successively connected to the sources of unidirectional electric potential to be measured at a rate faster than the period of response of the indicating or recording instruments utilized and, therefore, the response of the latter to the potential variations will be continuous. The measuring instruments provided may, however, be of a high speed type, and consequently, an indication and/or record of the magnitude and changes in magnitude of each of the sources of unidirectional electric potential may be obtained continuously and substantially instantaneously with the occurrence of such variations. The benefits and advantages which may be obtained with an arrangement of this kind will be apparent to those skilled in the art. Not only is the measurement of a plurality of variable conditions and the utilization of such measurement for control and analogous purposes by means of a single measuring instrument permitted, but also a substantial reduction in the amount of equipment involved is effected.

In this embodiment of the invention a separate fixed resistance and a separate measuring instrument is provided in cooperative relation with each source of unidirectional potential to be measured. Only a single electronic device is provided. The input circuit of the electronic device is connected in succession to each source of unidirectional electric potential in series with the fixed resistance associated with the latter, and simultaneously the output circuit of the electronic device is connected in series with said fixed resistance and the associated measuring instrument. The potential drop produced across the fixed resistance by the flow of output current through it from the electronic device is opposed to the source of unidirectional electric potential then connected to the input circuit of the electronic device and the differential of these opposed potentials is translated by a suitable converter incorporated in the electronic device into an alternating current which may be readily amplified. This derived alternating current is impressed on the input circuit of an amplifier, also incorporated in the electronic device, and the amplified quantity is rectified by a reconverter, also included in the electronic device, into a direct current of predetermined polarity. The direct current so derived comprises the output current of the electronic device referred to and is passed through the fixed resistance and through the measuring instrument which is associated with the particular source of direct electric potential then under measurement. The quantity of direct current required to produce a potential drop across the fixed resistance of a magnitude sufficient to balance the potential of the source of unidirectional potential under measurement will vary in accordance with the variations in the latter and a measure of such variations will be provided by the measuring instrument.

Rapidly operating switching means are provided for successively connecting each of the unidirectional potentials under measurement to the input circuit of the electronic device and for simultaneously connecting to the output circuit of the electronic device the measuring instrument and resistance which are associated with the particular source of unidirectional electric potential then connected to the input circuit of the electronic device. By providing rapidly operating switching means the sources of unidirectional electric potentials under measurement may be connected to the input circuit of the electronic device and the resistances and measuring instruments to the output circuit thereof faster than the period of response of the measuring instruments whereby the operation of each of the measuring instruments for all practical purposes will be the same as that if it were permanently connected to the output circuit of the electronic device and the source of unidirectional electric potential associated therewith were permanently connected to the input circuit of the electronic device. The measuring instruments utilized may be of a relatively rugged type and suitable provisions may be made for effecting control or analogous operations in accordance with the measurements obtained.

The invention is not restricted in its application to providing simultaneous and continuous measuring and/or controlling functions in accordance with the variations in magnitude in a plurality of variable conditions, but is adapted to many different and varied applications. Thus, in another embodiment of my invention the electronic device is alternately connected to the output terminals of a self-balancing potentiometer circuit for measuring the variations in potential produced by a thermocouple and to the output terminals of a proportioning system of the bridge type which is adapted to be unbalanced in accordance with adjustments of the self-balancing potentiometer circuit for effecting rebalancing adjustments of the proportioning system and for simultaneously effecting corresponding modulating adjustments of a fuel valve.

The various features of novelty which characterize the present invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a diagrammatic representation of one embodiment of the invention;

Fig. 2 illustrates in detail one form of electronic device comprising converter, amplifier and reconverter which may be utilized in the arrangement of Fig. 1;

Fig. 3 illustrates a modification of the measuring apparatus of Fig. 1 which may be utilized for obtaining a measurement of a larger number of variable conditions;

Fig. 4 is a schematic illustration of one form of switching means which may be utilized in the arrangement of Fig. 3;

Fig. 5 illustrates a modification of Fig. 3 which may be used to obtain a record on a single chart of the variations in magnitude of all of the variable conditions;

Fig. 6 is a diagrammatic representation of another embodiment of the invention for effecting control operations and which utilizes a non-self-balancing type of potentiometer system;

Fig. 7 illustrates a modification of the arrangement of Fig. 6 for obtaining proportioning control;

Figure 8:
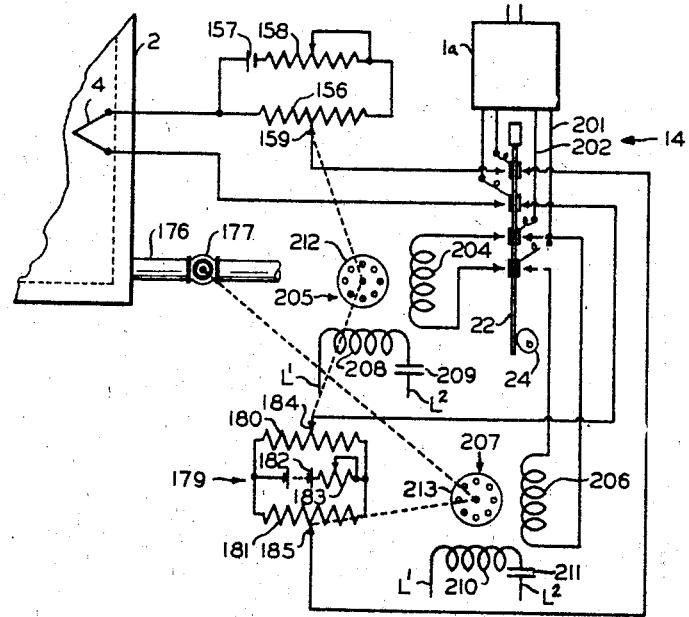
Fig. 8 is a diagrammatic representation of another embodiment of the invention incorporating a self-balancing system for obtaining proportioning control.

Referring now to Fig. 1 of the drawing there is illustrated in schematic form an arrangement including an electronic device 1, shown in detail in Fig. 2, for producing effects in accordance with the extent of unbalance of a potentiometric network which controls the electronic device 1 and is unbalanced in accordance with the variations in a quantity to be measured and in which because of the small magnitude of the unbalanced potentiometric electromotive forces it is not practicable nor desirable to have the said effects produced directly by the potentiometric network.

More specifically, an arrangement is illustrated in Fig. 1 for indicating the temperatures in the interior of a plurality of furnaces which have been indicated by the reference numerals 2 and 3. A thermocouple 4 is arranged within the furnace 2 so as to be responsive to slight changes in temperature therein and a thermocouple 5 is similarly arranged within the furnace 3. The thermocouples 4 and 5 may be located at a distance from the remainder of the measuring apparatus.

The thermocouple 4 is connected by a pair of conductors 6 and 7a to the terminals of a potentiometric network indicated generally by the reference character 7 and the thermocouple 5 is connected by a pair of conductors 8 and 9 to the terminals of a potentiometric network indicated generally by the reference character 10. The potentiometric network 7 also has connected therein a fixed resistance 11 and has its output terminals connected to contacts 12 and 13 of a switching device which has been indicated generally by the reference numeral 14. The potentioimetric network 10 similarly has connected therein a fixed resistance 15 and has its output terminals connected to contacts 16 and 17 of switching device 14.

The switching device 14 comprises the contacts 12, 13, 16 and 17 already referred to and also includes additional contacts 18, 19, 20 and 21. The contacts 12, 13, 16, 17, 18, 19, 20 and 21 are all insulated from each other and are all mounted in the same plane in any convenient manner. The switching device 14 also includes a reed 22 which is rigidly supported at one end by a stationary block 23 and is adapted to have a vibratory motion imparted thereto. To this end the free end of the reed 22 is arranged in cooperative relation with a continuously rotating cam 24. The cam 24 may be rotated in a convenient manner as by means of a unidirectional electric motor not shown in order to avoid complication of the drawing. It will be understood that the vibratory motion of the reed 22 may be obtained by means of providing suitable electromagnetic means in cooperative relation with the free end of the reed 22, if desired, instead of by means of cam 24. For example, electromagnetic means such as disclosed in Patent 2,171,279, issued on August 29, 1939, to Raymond H. Sullivan may be utilized for producing the vibratory motion of reed 22.

The reed 22 is provided with contacts 25, 26, 27 and 28 which are positioned along the length thereof in such manner that when the reed is actuated to the left as seen in the drawing the contacts 25, 26, 27, and 28 engage the stationary contacts 12, 13, 18 and 19 respectively. When the reed 22 is actuated to the right the contacts 25, 26, 27 and 28 move into engagement with the contacts 16, 17, 20 and 21 respectively. The contacts 25, 26, 27 and 28 are insulated from each other and from the reed 22.

The contacts 25 and 26 are permanently connected by conductors 29 and 30 to the input circuit of the electronic device 1, and consequently, when the reed 22 is actuated to the left the switching device 14 operates to connect the output terminals of the potentiometric network 7 to the input circuit of the electronic device 1 and when the reed 22 is actuated to the right, the switching device 14 operates to connect the output terminals of the potentiometric network 10 to the input circuit of the electronic device 1. Thus, the switching device 14 is operative to alternately connect the output terminals of the potentiometric networks 7 and 10 to the input terminals of the electronic device 1. This operation is preferably effected at a relatively rapid rate for reasons which are explained in detail hereinafter.

The contacts 27 and 28 of switching device 14 are connected by conductors 31 and 32 to the output circuit of the electronic device 1. The stationary contact 18 is connected by a conductor 33 to one output terminal of the potentiometric network 7 and thus to one terminal of the resistance 11, while the stationary contact 19 is connected by a conductor 34, in which a current indicating instrument 35 is inserted, to the other terminal of the resistance 11. Similarly, the stationary contact 20 is connected by conductor 36 to one output terminal of the potentiometric network 10 and thus to one terminal of the resistance 15 and the stationary contact 21 is connected by a conductor 37, in which a current indicating instrument 38 is inserted, to the other terminal of the resistance 15.

By virtue of these connections, when the reed 22 is actuated to the left the resistance 11 and indicating instrument 35 are connected in series in the output circuit of the electronic device 1 and when the reed 22 is actuated to the right the resistance 15 and the indicating instrument 38 are connected in series in the output circuit of the electronic device 1. It will thus be seen that when the reed 22 is actuated to the left to connect the output terminals of the potentiometric network 7 to the input circuit of the electronic device 1, the resistance 11 and indicating device are at the same time connected in series in the output circuit of device 1. Likewise, when the reed 22 is actuated to the right to connect the output terminals of the potentiometric network 10 to the input circuit of the electronic device 1, the resistance 15 and indicating device 38 are at the same time connected in the output circuit in the device 1.

In the arrangement of Fig. 1 the electromotive force developed by the thermocouple 4 is opposed to the potential drop produced across the fixed resistance 11 by the flow of current through the output circuit of the electronic device 1. The output circuit of device 1, is controlled in accordance with the state of balance between the opposed electromotive forces in the potentiometric network 7, and therefore, the current flow through the resistance 11 is also controlled in accordance with the state of balance of the potentiometric network 7. As shown, a condenser 11a is connected in shunt to the resistance 11 and instrument 35 for smoothing out the periodic pulses in unidirectional current flow therethrough from the output circuit of device 1. The indicating instrument 35 may be a milliammeter type indicator and is provided to measure the current supplied to the resistance 11 from the output circuit of the electronic means 1. The value of current flow through the resistance 11 required to produce a potential drop across the latter of the magnitude needed to balance out the electromotive force of the thermocouple 4 and which is measured by the instrument 35 will provide a measure of the temperature to which the thermocouple 4 is subjected. The instrument 35 may be calibrated in terms of temperature to provide an indication of the temperature in the interior of the furnace 2 to which the thermocouple 4 is subjected.

The operation of the potentiometric network 10 is similar to that of the potentiometric network 7. Specifically, the electromotive force developed by the thermocouple 5 is opposed to the potential drop produced across the fixed resistance 15 by the flow of current through the latter from the output circuit of the electronic device 1. The current flow in the output circuit of the electronic device 1 is controlled in accordance with the state of balance between the electromotive force of the thermocouple 5 and the potential drop across the resistance 15, and consequently, the current flow through the resistance 15 is also controlled in accordance with the state of balance of those electromotive forces. A condenser 15a is connected in shunt to the resistance 15 and instrument 38 to smooth out the periodic pulses in current through these elements from device 1.

The indicating device 38 may be also a milliammeter type indicator and is connected in the output circuit of the electronic means 1 to measure the current flow through resistance 15 from the electronic device 1. The current flow through the resistance 15 required to balance the electromotive force developed by the thermocouple 5 will provide a measure of the temperature to which the thermocouple 5 is subjected and when the instrument 38 is calibrated in terms of temperature the instrument provides an indication of the temperature within the interior of the furnace 3 to which thermocouple 5 is subjected.

It will be apparent that, if desired, a milliammeter type recorder may be utilized in lieu of each of the milliammeter type indicators 35 and 38 or a milliammeter type recorder may be connected in series with the indicators 35 and 38 to provide a permanent record as well as indication of the furnace temperatures to which the thermocouples 4 and 5 are subjected.

The electronic device 1 illustrated schematically in Fig. 1 and in greater detail in Fig. 2 operates in conjunction with switching device 14 to alternately convert the unbalanced current of the potentiometric network 7 into pulsating currents which are capable of being readily amplified and the unbalanced currents of the potentiometric network 10 into pulsating currents capable of being readily amplified. A converter unit which has been indicated in Fig. 2 by the reference character 39 is provided in the electronic device 1 to obtain this result. The converting device 39 includes an interrupter 40 and a transformer 41. The converting device 39 includes a vibrating reed 42 and a pair of relatively stationary contacts 43 and 44. The transformer 41 includes a center tapped primary winding 45 and a secondary winding 46. One end terminal of the primary winding 45 is connected to the contact 44 and the other end terminal of the winding 45 is connected to the stationary contact 43. The conductor 29 which is permanently connected to the contact 25 of the switching device 14 is connected to the vibrating reed 42 of the interrupter 40 and the conductor 30 which is permanently connected to the contact 26 of the switching device 14 is connected to the center tap on the transformer primary winding 45. When the vibrating reed 42 of the interrupter 40 is in engagement with the contact 43 the lower half of the primary winding 45 of the transformer 41 is adapted to be connected to the output terminals of the potentiometric networks 7 and 10 and when the vibrating reed 42 is in engagement with the contact 44 the upper half of the transformer primary winding 45 is adapted to be connected to the output terminals of the potentiometric networks 7 and 10.

The converting device 39 illustrated schematically in the drawing may be of any suitable type and by way of example may be of the type shown and described in application serial No. 421,176 which was filed by Frederick W. Side on December 1, 1941, and which issued on July 8, 1947, as Patent No. 2,423,524, and is assigned to applicant's assignee. The interrupter 40 is essentially a polarized switching mechanism and is provided with an operating winding 47 which is connected to and receives energizing current from the low voltage secondary winding 48 of a transformer 49 and which is arranged in cooperative relation with the reed 42 to vibrate the latter in synchronism with the alternating current supplied the operating coil 47 from the transformer secondary winding 48. The transformer 49 is a combination step-up and step-down transformer and is provided with a line voltage primary winding 50 and high voltage secondary windings 51, 52 and 53, in addition to the low voltage secondary winding 48. The primary winding 50 of the transformer is connected to and receives energizing current from the alternating current supply conductors $L^1$ and $L^2$ which may desirably supply 60 cycle alternating current. Thus, the vibrating reed 42 of the converting device will be vibrated in synchronism with the alternating current supply.

For purposes of explanation it may be assumed that contact 43 of the interrupter 40 is engaged by the vibrating reed 42 during the half cycle of the alternating current when the voltage is positive and the second contact 44 is engaged by the vibrating reed 42, during the second half cycle when the voltage of the alternating current supply is negative. Thus, the reed 42 and the contact 43 engage when the voltage of the alternating current supply is positive and the reed 42 and the contact 44 engage when the voltage of the alternating current supply is negative. As is explained in the Side patent referred to herein before, when the reed 42 is in its mid-position both of the contacts 43 and 44 are engaged by the reed 42 so that when the reed 42 is operated it is alternately in engagement with one or the other of the contacts 43 and 44.

Upon the assumption that the potentiometric network 7 is balanced when connected to the input circuit of the electronic device 1, no unbalanced current will flow in the potentiometric network, and accordingly, operation of the converting device 39 will be ineffective to cause the flow of current through the primary winding 45 of the transformer 41. When the electromotive force produced by the thermocouple 4 increases to unbalance the potentiometric network 7 in one direction, however, the unbalanced potentiometric network direct currents will flow in the direction from the interrupter 40 to the transformer 41, and when the electromotive force of the thermocouple 4 decreases to unbalance the potentiometric network, the potentiometric unbalanced current will flow in the direction from the transformer 41 to the interrupter 40.

Thus, upon unbalance of the potentiometric network 7 in the direction to render the conductor 29 positive with respect to the conductor 30, unbalanced current during the first half cycle of the alternating current of the supply lines $L^1$ and $L^2$ will flow from the conductor 29 to the vibrating reed 42 to the contact 43 through the lower half of the transformer primary winding 45 to the conductor 30. During the second half cycle of the alternating current supply, current will flow from the conductor 29 to the reed 42, the contact 44 and through the upper half of the transformer primary winding 45 to the conductor 30. The pulsating direct current flows through the transformer primary winding 45, first through the lower half and then through the upper half, operates through the core structure of the transformer 41 to induce an alternating voltage in the transformer secondary winding 46 of one phase or of opposite phase relatively to the phase of the alternating current supplied by the mains $L^1$ and $L^2$.

Upon unbalance of the potentiometric network 7 in the opposite direction, the conductor 30 will be rendered positive with respect to the conductor 29, and therefore, the unbalanced potentiometric current flow through the transformer primary winding 45 will alternately be from the mid-point of the winding through the lower half of the winding when the reed 42 and the contact 43 are in engagement and through the upper half of the winding when the reed 42 and the contact 44 are in engagement. These pulsating direct current flows through the transformer primary winding 45 are in the opposite direction from what they were when the potentiometric network was unbalanced in the opposite direction and as a result these pulsating direct current flows operate through the core structure of the transformer 41 to induce an alternating voltage in the transformer secondary winding 46 which is of the opposite phase relatively to the voltage of the alternating current mains L¹ and L².

Accordingly, when the potentiometric network 7 is unbalanced in one direction, an alternating voltage of one phase relatively to the voltage supplied by mains L¹ and L² is produced in the transformer secondary winding 46, and when the potentiometric network is unbalanced in the opposite direction, an alternating voltage of the opposite phase relatively to the voltage of the supply mains L¹ and L² is induced in the transformer secondary winding 46. When the potentiometric network is balanced, no current flows through the primary winding 45 of the transformer 41, and hence, the alternating voltage derived in the transformer secondary winding 46 is zero.

The converter 39 operates in the identical manner to translate the unbalanced direct currents in the potentiometric network 10 into an alternating current of one phase or of opposite phase depending upon the direction of unbalance during the intervals that the potentiometric network 10 is connected to the input circuit of the electronic device 1.

Condenser 46a connected between the center tap of the transformer primary winding 45 and the lower terminal of the transformer secondary winding 46, which latter terminal is connected to ground, is provided to minimize the effects of capacity and leakage type stray currents which may be produced in the potentiometric networks 7 and 10.

The alternating voltage so derived in the transformer secondary winding 46 of the transformer 41 is amplified by means of an electronic valve amplifier circuit which comprises part of the electronic device 1 and has been indicated generally in Fig. 2 by the reference character 54.

The electronic amplifier 54 includes an electronic tube 55 to the input circuit of which the alternating voltage induced in the transformer secondary winding 46 is applied. The electronic tube 55 includes two heater type triodes which have been designated by the numerals 56 and 57 and are enclosed in the same envelope. The triode 56 includes anode, control electrode, cathode and heater filament elements and the triode 57 also includes like elements. The filaments of the triodes 56 and 57 are connected in parallel and receive energizing current from the low voltage secondary winding 48 of the transformer 49 through conductors which have not been shown in order to avoid complication of the drawing.

The transformer secondary winding 48 is also connected by means of conductors not shown to the heater filaments of a pair of electronic tubes 58 and 59. The electronic tube 58 includes two heater type triodes designated by the reference characters 60 and 61 within the same envelope. Both of the triodes of tube 58 include anode, control electrode, cathode and heater filament elements. The electronic tube 59 also includes two heater type triodes which have been designated by the reference characters 62 and 63 within the same envelope. The triodes 62 and 63 each include anode, control electrode, cathode and heater filament elements. The heater filaments of tubes 58 and 59 may all be connected in parallel to the transformer secondary winding 48.

The triode 61 of the electronic tube 58 is utilized as a half wave rectifier to provide a source of unidirectional voltage for energizing the anode or output circuits of the triodes 56, 57 and 60. As shown, the control electrode and cathode of the triode 61 are directly connected to each other and the output circuit thereof is energized by the transformer secondary winding 51 through a circuit which may be traced from the right end terminal of the winding 51, as seen in the drawing, through a conductor 64 to the anode of the triode 61, the cathode thereof, and through a conductor 65 to the positive terminal of a filter, generally designated by the reference character 66. The negative terminal of the filter 66 is connected by the conductor 67 to the left end terminal of the transformer secondary winding 51.

The filter 66 includes a condenser 68 which operates to smooth out the ripple in the output voltage of the filter between the points 69 and 70. The filter 66 also includes a resistance 71 and a condenser 72 which operate to smooth out the ripple between the points 69 and 73. The filter 66 includes a resistance 74 and a condenser 75 for smoothing out the output voltage between the filter points 69 and 76. Thus, the filter comprises three stages. Such a three stage filter is provided, because for satisfactory and efficient operation, it is desirable for the anode voltage supplied to the triode 56 to be substantially free from ripple, whereas it is not necessary to supply anode voltage as free from ripple to the output circuit of the triode 57. It is not necessary to supply anode voltage as completely free from ripple to the triode 60 as it is to the triode 57.

The anode circuit of the triode 56 may be traced from the filter point 76 which comprises the positive terminal of the filter, through a fixed resistance 77 to the anode of the triode 56, to the cathode thereof, and through a cathode biasing resistance 78 which is shunted by a condenser 79 to the negative filter point 69 through a conductor 80. The cathode biasing resistance 78 and the parallel connected condenser 79 are utilized for biasing the control electrode of triode 56 negative with respect to the cathode. The input circuit of triode 56 may be traced from the cathode through the parallel connected resistance 78 and condenser 79 through the transformer secondary winding 46 to the control electrode of the triode 56. A condenser 81 is provided in shunt to the winding 46 for tuning the latter.

The output circuit of the triode 56 is resistance capacity coupled to the input circuit of triode 57 by means of a condenser 82 and a resistance 83. To this end the anode of the triode 56 is connected by the condenser 82 to the control electrode of the triode 57 and the control electrode is connected through the resistance 83 to the conductor 80 and through a biasing resistance 84 to the cathode of the triode 57.

The anode circuit of the triode 57 may be traced from the positive terminal 73 of the filter 66 through a fixed resistance 84 to the anode of the triode 57, the cathode thereof, biasing resistance 84 which is shunted by a condenser 85 to the conductor 80 and thereby to the negative terminal 69 of the filter.

The output circuit of the triode 57 is resistance capacity coupled to the input circuit of the triode 60 by means of a condenser 85 which is connected between the anode of the triode 57 and the control electrode of the triode 60 and by means of a resistance 86 which is connected between the control electrode of the triode 60 and the cathode thereof. The resistances 83 and 86 which are connected in the input circuits of the triodes 57 and 60, respectively, operate to maintain the potential of the control electrodes of the triodes 57 and 60 at some predetermined value relative to the potention of the associated cathode when no voltage is induced in the winding 46. That is to say, the resistance 83 operates to maintain the potential of the control electrode of triode 57 at the potential of the lower end of the biasing resistance 84 while the resistance 86 operates to maintain the potential of the control electrode of the triode 60 at the potential of its associated cathode during the time when no voltage is induced in the winding 46. Upon the induction of an alternating voltage in the transformer secondary winding 46, resistances 83 and 86 permit the flow of grid current between the control electrodes of the triodes 57 and 60 and their associated cathodes and thereby limit the extent the control electrodes of the triodes are permitted to go positive with respect to their associated cathodes.

As illustrated, a contact 87 which is in adjustable engagement with the resistance 86 is provided for varying the point of connection of the control electrode of triode 60 to the resistance 86. The resistance 86 and contact 87 perform a dual function, namely, to limit the extent to which the control electrode of the triode 60 may be driven positive with respect to its associated cathode and also to vary the proportion of signal from the output circuit of the triode 57 which is impressed on the input circuit of triode 60.

The anode circuit of the triode 60 may be traced from the positive terminal 70 of the filter 66, through a fixed resistance 87 to the anode of the triode, the cathode thereof, and conductor 80 to the negative terminal 69 of the filter.

The output circuit of the triode 60 is resistance capacity coupled by means of a condenser 88 and a resistance 89 to the input circuits of the triodes 62 and 63 which input circuits are connected in parallel and comprise the input circuit of a reconverter designated generally by reference numeral 99. Anode voltage is supplied the output circuits of the triodes 62 and 63 from the high voltage secondary windings 52 and 53, respectively. The anode of the triode 62 is connected to the right end terminal of the transformer secondary winding 52 and the anode of the triode 63 is connected to the left end terminal of the transformer secondary winding 53. The cathodes of the triodes 62 and 63 are connected together and through a conductor 90 to one terminal of each of a pair of resistances 91 and 92 which are shunted by condensers 93 and 94, respectively. The other terminal of resistance 91 is connected by a conductor 95, in which a fixed resistance 96 is inserted, to the left end terminal of the winding 52, and the other terminal of the resistance 92 is connected by a conductor 97, in which a fixed resistance 98 is inserted, to the right end terminal of the transformer secondary winding 53.

Thus, the anode circuit of the triode 62 is completed through the resistance 91 and the flow of anode current through this resistance operates to render the lower end of the resistance 91 positive with respect to the upper end thereof. On the other hand the anode circuit of the triode 63 is completed through the resistance 92 and the flow of anode current through the resistance 92 operates to render the upper end positive with respect to the lower end of the resistance. The transformer secondary windings 52 and 53 are so wound on the transformer that for the first half cycle of the alternating current supplied by conductors $L^1$ and $L^2$ the anode of the triode 62 is positive with respect to its associated cathode whereby the triode 62 is conductive. During this half cycle the anode of the triode 63 is negative with respect to its associated cathode, and therefore, the triode 63 is non-conductive. During the second half cycle of the alternating current supply the anode of the triode 63 is positive and the anode of the triode 62 is negative. Accordingly, during this half cycle the triode 63 is rendered conductive and the triode 62 is rendered non-conductive. Thus the triodes 62 and 63 are arranged to be alternately conductive.

The output circuits of the triodes 62 and 63 are coupled to the input circuit of an electronic tube 100. The electronic tube 100 may be of the type known and sold commercially as beam power amplifier tubes. The tube 100 is provided with anode, screen, control electrode, cathode, heater filament and beam forming electrodes and is arranged to be supplied with anode voltage from the transformer secondary winding 53. The heater filament of the tube 100 is connected by conductors not shown to the low voltage transformer secondary winding 48.

The input circuit of the electronic tube 100 may be traced from the control electrode of this tube through a fixed resistance 101 and through the resistances 91 and 92 to the cathode of the tube. It will be noted that the potential drop across the resistance 91 tends to drive the control electrode of the tube 100 negative with respect to the potential of its associated cathode. On the other hand the potential drop across resistance 92 tends to drive the control electrode of tube 100 positive with respect to the potential of its associated cathode. Thus, when the triodes 62 and 63 are equally conductive the potential of the control electrode of tube 100 will be the same as that of its associated cathode. When the triode 62 becomes more conductive than the triode 63 however, the control electrode of the tube 100 will be driven negative, while it will tend to be driven positive when the triode 63 becomes more conductive than the triode 62.

The output circuit of the tube 100 may be traced from the left end terminal of the transformer secondary winding 53 to the conductor 31 to the output circuit of the electronic device 1, and from the conductor 32 to the anode of tube 100, the cathode thereof and resistance 98 to the right end terminal of winding 53. As shown, a condenser 102 may desirably be connected between the conductors 31 and 32 for smoothing out the ripple in the output current from the tube 100 which flows through the conductors 31 and 32. The conductors 31 and 32 comprise the output conductors of the electronic device 1 and are arranged to be connected alternately in series with the indicating device 35 and resistance 11 of the potentiometric network 7 and the indicating device 38 and resistance 15 of the potentiometric network 10. The current flow through the conductors 31 and 32 is always in the same direction from the left end terminal of the winding 53 through the conductor 31, through the load circuit connected in the conductors 31 and 32, to the anode of tube 100 and through the conductor 97 and resistance 98 to the right end terminal of the transformer secondary winding 53. This current flow is a predetermined value when the triodes 62 and 63 are equally conductive and is increased when a signal is impressed upon the input circuits of the triodes 62 and 63 of the proper phase to render the triode 63 more conductive than the triode 62. Likewise, the current flow in the output circuit of the tube 100 is decreased when the signal impressed on the input circuits of the triodes 62 and 63 is of the proper phase to render the triode 62 more conductive than the triode 63.

The resistances 11 and 15 connected in the potentiometric networks 7 and 10 respectively, may be so chosen that when the current flow in the output circuit of the tube 100 is that which flows when the triodes 62 and 63 are equally conductive, the potentiometric networks 7 and 10 will be precisely balanced. When the potentiometric networks 7 and 10 are unbalanced as a result of the potential developed by the thermocouples 4 and 5 becoming greater than the potential drops across the resistances 11 and 15, the alternating voltage derived in the transformer secondary winding 46 is of the proper phase to effect an increase in the conductivity of the triode 63 and a corresponding decrease in the conductivity of the triode 62. As a result the current flow in the output circuit of the tube 100 will increase to effect an increase in the potential drop across the resistances 11 and 15. The change in the output current in the tube 100, therefore, is in the proper direction to tend to restore the state of balance of the potentiometric networks 7 and 10.

Upon unbalance of the potentiometric networks 7 and 10 in the opposite direction, as a result of a decrease in the electromotive force produced by the thermocouples 4 and 5, the triode 62 will be rendered more conductive than the triode 63 whereby the current flow in the output circuit of the tube 100 will be decreased to effect a corresponding reduction in the potential drop across the resistances 11 and 15, thus tending to restore the state of balance of the potentiometric networks. In each case the change in output current from the tube 100 will be that required to substantially rebalance the networks 7 and 10. Such flow of output current through the indicating instruments 35 and 38 will provide a measurement of the temperature within the interior of the furnaces 2 and 3 to which the thermocouples 4 and 5 are subjected.

It will be noted that upon unbalance of the potentiometric networks 7 and 10 in one direction or the other from their condition of precise balance it is necessary that some unbalanced currents flow in the potentiometric networks 7 and 10 in order to maintain the new output current from the reconverter 99. These unbalanced currents are translated by the converter 39 into an alternating current which is amplified by the amplifier 54 and the amplified quantity is utilized to modify the direct current output from the reconverter 99 as is required to substantially restore the state of balance of the potentiometric networks. That is to say, in order to maintain this new current output from the reconverter 99 it is necessary to maintain an alternating potential on the input circuit of the amplifier 54, and therefore, to maintain some unbalance in the potentiometric networks 7 and 10. Although the potentiometric networks 7 and 10 are not precisely balanced, they are maintained in a state of equilibrium, however, the unbalanced current flows in the potentiometric networks 7 and 10 being exactly that value required to maintain the proper potential drop across the resistances 11 and 15 to cause the said unbalanced current to flow in the potentiometric networks. The unbalance of the potentiometric networks 7 and 10 required to maintain the new and different output current from the reconverter 99 throughout the working range of the apparatus is very small and for all practical purposes is insignificant. Thus, for practical purposes the arrangement of Figs. 1 and 2 operates just as if the potentiometric networks 7 and 10 were precisely balanced.

From the foregoing description it will be clear that my present invention comprises a self-balancing measuring apparatus which is adapted to simultaneously and continuously measure the temperature variations to which a plurality of thermocouples are subjected and in which the means responsive to the potentiometric unbalance does not require the use of movable apparatus such as galvanometers or other like devices for determining the state of balance of the potentiometric networks. In addition the potentiometric networks are rebalanced or restored to a stabilized state without requiring the use of any physically movable apparatus whatever for this purpose. Consequently the apparatus is quick in its operation and is not only capable of simultaneously measuring the temperature conditions at a plurality of remote points but also is capable of measuring such temperatures at relatively high speed.

In Fig. 3 I have illustrated, more or less diagrammatically, a modification of the measuring apparatus disclosed in the arrangement of Fig. 1 in which a measure of the temperature variations at more than two remote points may be continuously and simultaneously obtained and which also requires the use of only a single electronic device 1. The arrangement of Fig. 3 has been shown as adapted to indicate continuously and simultaneously the temperature variations to which four thermocouples are subjected. It will be clear that the temperature variations to which a larger number of thermocouples are subjected may be continuously and simultaneously indicated, if desired, by modification of the arrangement of Fig. 3 which will be obvious from the description of this arrangement given hereafter. In order to avoid unnecessary complications of the drawings only two thermocouples 103 and 104 have been shown. The arrangement of Fig. 3 like that of Fig. 1 is of the self-balancing potentiometric type.

A switching device 105 is provided in the arrangement of Fig. 3 for connecting each of the four thermocouples to the input circuit of the electronic device 1, and a switching device 106 is provided for successively connecting a plurality of electrical indicating instruments to the output circuit of the electronic device 1. Only two indicating instruments 107 and 108 have been illustrated. An indicating instrument is provided in association with each of the thermocouples and is connected to the output circuit of the electronic device 1 when the thermocouple associated therewith is connected to the input circuit of the electronic device 1. To this end the switching devices 105 and 106 are operated in synchronism. In order to smooth out the periodic pulses of current flow through the indicating devices a separate condenser is connected in parallel with each one of the indicating devices. Thus, a condenser 109 is connected in parallel with the indicating device 107 and a condenser 110 is connected in parallel with the indicating device 108.

The switching devices 105 and 106 may be of any suitable type capable of high speed operation and by way of example may be of the type illustrated in detail in Fig. 4 of the drawings. In Fig. 4 only the switching device 105 has been illustrated, but the switching device 106 may be of the identical type. The switching device illustrated in Fig. 4 comprises a plurality of circularly disposed terminals 111, 112, 113, 114, 115, 116, 117 and 118. A rotary contacting device 119 is provided which comprises two contacting arms 120 and 121 which are rigid with each other and are so positioned with respect to the stationary terminals 111—118 that only two of the said terminals are contacted by the arms 120 and 121 at any instant of time. Upon rotation of the contacting device 119 the contacting arms successively bridge successive pairs of contacts 111 and 118, 112 and 113, 114 and 115, and 116 and 117.

The contacting arms 120 and 121 are formed of conducting material and are connected to and are rigid with slip rings 122 and 123. Brushes 124 and 125 bear upon the slip rings 122 and 123, respectively, and serve to connect the pairs of contacts 111 and 118, 112 and 113, 114 and 115, and 116 and 117 in succession to the input circuit of the electronic device 1. The terminals of the thermocouple 103 are permanently connected to the pair of contacts 111 and 118 while the terminals of the thermocouple 104 are permanently connected to the pair of contacts 116 and 117. The terminals of the other two thermocouples (not shown) are permanently connected to the pairs of contacts 112, 113 and 114, 115, respectively. Thus, as the contacting device 119 is rotated the thermocouples 103 and 104, etc., are connected in succession to the input circuit of the electronic device 1.

The rotation of the contacting device 119 may be accomplished in any convenient manner. Thus a pulley 126, a belt 127 and any suitable operating means which for purposes of illustration have been shown as a continuously rotating unidirectional motor 128 may be utilized to effect rotation of contacting device 119.

As the contacting device 119 rotates in the direction indicated by the arrows the contact arms 120 and 121 will consecutively engage successive pairs of contacts to thereby connect each of the thermocouples to the input circuit of the electronic device 1 in succession. After an entire revolution has been made, the contacting device 119 will repeat the above cycle of operation. While only four pairs of contacts have been provided on the switch 105, it will be apparent that any desired number of contacts within limits of mechanical construction may be utilized and that the number employed is determined by the number of thermocouples it is desired to successively connect to the electronic device 1.

The switching device 106 of Fig. 3 may be exactly like the switching device 105 shown in Fig. 4 and preferably is provided with a contacting device which is rotated by means of the belt 127 and the electrical motor 128. To this end the shaft of the contacting device of the switch 106 may be integral with the shaft 129 of the contacting device 119.

In Fig. 5 I have illustrated a modification of the arrangement of Fig. 3 which may be employed to record on a single chart the temperature variations at a plurality of remote locations by means of the utilization of only a single electronic device 1. A thermocouple 103, 104, etc., is provided at each location where it is desired to measure the temperature and in order to effect cooperation of each individual thermocouple with the common recording device, switching device 105 and a cam operated mechanism 130 are provided for successively connecting the thermocouples to the input circuit of the electronic device 1 and for simultaneously conditioning a recording device 131 to provide a separate and distinct record of the temperatures to which each of the thermocouples is subjected.

The recording device 131 includes a galvanometer 132 the terminals of which are permanently connected to the output circuit of the electronic device. The galvanometer 132 is provided with a pointer 133 which is disposed in cooperative relation with a chart 134. The chart 134 is unwound from a roll 135 onto a roll 136 which is driven at a constant speed by a unidirectional electrical motor 137. The galvanometer pointer 133 is lowered and raised under the control of a depressor bar 138 which is pivotally supported above the pointer 133 in any suitable manner, as by pivots 139 and 140, and is operated by a cam 141 on which the depressor bar rests and which is rotated by motor 137 through gearing indicated schematically at 142 and 143.

A suitable multi-colored typewriter ribbon 144 is disposed between the galvanometer pointer and the chart 134, preferably directly above the roller 135 so that when the bar moves the pointer downward it will press the ribbon against the chart to make a mark on the chart on each downward movement of the bar to make a record of the successive positions assumed by the pointer.

The cam operated mechanism 130 is provided for moving a different colored section of the marker ribbon 144 under the pointer 133 of galvanometer 132 whenever a different thermocouple is connected in the input circuit of the electronic device 1 by means of the switching mechanism 105. Successive movements of the cooperating depressor bar 138 in a downward direction into engagement with the galvanometer pointer 133 result in a series of contiguous marks being made on the chart 134 for each thermocouple, each series of marks being of a color corresponding to the thermocouple individual thereto. In this manner the records produced on the chart 134 for each of the thermocouples may be readily distinguished.

In Fig. 5 the shaft 129 of switching device 105 is operatively connected to the shaft of motor 137 by suitable gearing indicated by the dotted lines and is rotated in synchronism with the cam 141 which actuates the depressor bar 138 and also in synchronism with a cam 145 which operates the marker ribbon adjusting means. Thus, the switching means 105 in this embodiment of my invention is operated at a considerably slower rate than the switching device 105 of Fig. 3 which is shown in detail in Fig. 4.

The cam operated mechanism 130 referred to for moving a different colored section of the ribbon 144 under the galvanometer pointer 133 whenever a different thermocouple is connected to the input circuit of device 1 includes cam 145 which, as noted, is rigid with shaft 129 of the switching device 105 and rotates therewith. The cam 145 is so configured as to provide edge segments 146, 147, 148 and 149 which are adapted to cooperate with a roller 150 on the lower end of an arm 151 which is pivoted for rotation on a shaft 152. Arm 151 is biased for rotation in a counterclockwise direction by means of a spring 153 so that the roller 150 on the end of arm 151 is held into engagement with the edge of the cam 145. A disc 154 mounted for rotation on the shaft 129 and integral with the cam 145 is provided for guiding the roller 150 so as to prevent the latter from sliding off the edge of the cam. Two similar discs 154 mounted on opposite sides of the cam may be employed for this purpose. The other end of the arm 151 is connected to a ribbon guide roll link 155 so that when the cam 145 rotates and the roller 150 engages and then leaves the province of the edge segments 146, 147, 148 and 149 in succession, a series of lateral movements is imparted to the link 155 to move the various sections of the ribbon 144 under the galvanometer pointer.

Thus, as the contacting device of the switching device 105 operates to successively connect the different thermocouples to the input circuit of the electronic device 1, a corresponding colored section of the ribbon 144 will be moved under the galvanometer pointer 133 so that a record of the temperature to which each of the thermocouples is exposed will be recorded as a series of marks of a single color on the chart 134. In this manner a record of the temperatures to which all of the thermocouples are subjected will be produced on a single chart. While all of the records so produced are not made simultaneously and continuously as are the indications provided by the arrangements of Figs. 1 and 3, in some cases such simultaneous and continuous recordings are not required while it is desirable to obtain a record on a single chart of the variations in a number of variable conditions, and therefore, in those cases the arrangement of Fig. 5 may be utilized with advantage since only a single electronic device 1 is required to obtain all of the records.

In Fig. 6 I have illustrated an embodiment of the present invention which is operative to continuously and simultaneously effect a desired control operation at each of a plurality of remote points responsively to the variations in a variable condition at each of said points while utilizing only a single electronic device 1 for this purpose. The apparatus disclosed in Fig. 6 operates to effect so called blind control, and more particularly, operates to effect two position blind control. That is to say, the control apparatus of Fig. 6 has no provision for indicating or recording the temperature variations to which each of the thermocouples are subjected. The control apparatus of Fig. 6, in addition, is of the non-self-balancing type.

For purposes of illustration the arrangement of Fig. 6 has been shown operative to control the temperature variations at two remote points. It will be understood, however, that, if desired, the arrangement may be modified to control the temperature at a greater number of remote points.

In Fig. 6 the electromotive force produced by a thermocouple 4 is opposed to the variable part of the potential drop maintained across a slide wire resistance 156 by the passage of the current therethrough from a battery 157. A rheostat 158 is connected in series with battery 157 and the resistance 156 to permit suitable adjustments of the current flow through resistance 156 and thereby desired variation in the potential drop across the resistance 156. A contact 159 is provided in slideable engagement with the resistance 156 for facilitating the tapping off of a desired part of the potential drop across resistance 156.

Similarly, the electromotive force of the thermocouple 5 is connected in opposition to a variable part of the electromotive force maintained across a slide wire resistance 160 by a battery 161 and a rheostat 162. A switching device 163 which may be generally like the switching device 105 disclosed in Fig. 4 but is provided with only two pairs of contacts 164, 165, and 166, 167 is utilized in Fig. 6 for alternately connecting the thermocouple 4 and slide wire resistance 156 to the input circuit of the electronic device 1 and the thermocouple 5 and the slide wire resistance 160 to the input circuit of the electronic device 1.

A switching device 168 which may be identical to the switching device 163 and is operated in synchronism therewith is provided for connecting the output circuit of the electronic device 1 alternately to the terminals of a relay 169 and a relay 170. The relay 169 is provided with an armature 169a and associated contacts 171 and 172 and the relay 170 is provided with an armature 173 and associated contacts 174 and 175. A condenser is connected in parallel with the operating coil of each of the relays 169 and 170 in order to smooth out the periodic pulses in unidirectional current flow therethrough from the output circuit of device 1. The armature 169a and its associated contacts may be arranged in any convenient manner to control the operation of suitable control apparatus such as a motor operated valve which controls the flow of heating agent to the locality in which the thermocouple 4 is exposed in accordance with the temperature variations of that locality as required to maintain the temperature at a constant value. The armature 173 and its associated contacts may be similarly arranged to control the temperature of the locality to which the thermocouple 5 is exposed. The electrical connections of the relay armatures and contacts to the motor of the motor operated valve may be similar to those shown in Fig. 7.

In Fig. 7 I have illustrated, more or less diagrammatically, an embodiment of the present invention which is adapted to effect so called "floating control" regulating operation and which utilizes a deflectional type potentiometric measuring circuit of the form disclosed in Fig. 6. In Fig. 7 the thermocouple 4 is shown disposed within a furnace 2 to which a supply of heating agent is passed through a pipe 176. A valve 177 is inserted in the pipe 176 for controlling the supply of heating agent to the furnace 2 and is arranged to be operated between its open and closed positions by means of a reversible electrical motor 178. The manner in which this result is accomplished is described hereinafter.

In Fig. 7 the thermocouple electromotive force is opposed to a variable portion of the potential drop across the slide wire resistance 156 as in the arrangement of Fig. 6 and the difference in these opposed potentials is arranged to be periodically impressed on the input circuit of the electronic device 1. The input circuit of device 1 is alternately adapted to be connected to the terminals of the deflectional type potentiometer and to the output terminals of an electrical bridge circuit 179 to be described. The output circuit of the electronic device 1 is alternately connected to the terminals of relays 169 and 170, respectively.

The bridge 179 is comprised of two slide wire resistances 180 and 181 which are connected in parallel and through which a current of predetermined magnitude is maintained by means of a battery 182 and an associated rheostat 183. One output terminal of the bridge 179 comprises the point of engagement of a contact 184 with the resistance 180 and the other output terminal of the bridge comprises the point of engagement of a contact 185 with the resistance 181.

As shown, the contact 184 is connected by a conductor 186 to the contact 17 of the switch 14 and the contact 185 is connected by conductor 187 to the contact 16 of the switch 14. The switch may be identical to the corresponding identified part of Fig. 1. One output terminal of the potentiometric network is connected to the contact 12 and the other output terminal is connected to the contact 13 of switch 14. The contacts 25 and 26 carried by the vibrating reed 22 are connected to the input circuit of the electronic device 1, and therefore, when the reed 22 is deflected to the left, as seen in the drawing, the potentiometric unbalance potential is impressed on the input circuit of the electronic device 1, and when the reed 22 is deflected to the right the unbalanced potential derived from the bridge circuit 179 is impressed on the input circuit of the electronic device 1.

As will be recognized by those skilled in the art, the bridge network 179 may be energized from a source of alternating current of the same frequency as the supply lines $L^1$ and $L^2$ instead of from the direct current source 182. With the arrangement of Fig. 7 so modified, it is necessary to provide an additional pair of insulated contacts on the reed 22 of the switching device 14 and an additional pair of relatively stationary contacts for connecting the output or balancing terminals of the bridge network 179 directly to the end terminals of the transformer primary winding 45 in the electronic device 1 since the use of the converting device 39 is not then required, the output of the bridge 179 originally being alternating current.

The output circuit of the electronic device 1 is alternately connected by the contacts 27 and 28 carried by the reed 22 to the terminals of the relays 169 and 170. The relay 169 is arranged to control the rotation and direction of a reversible electrical motor 188. To this end the contacts 171 and 172 of the relay are connected to one end of a respective winding 189 and 190 of the motor 188. The motor 188 is a two-phase reversible electrical motor and the other ends of the windings 189 and 190 are connected together and to the alternating current supply conductor $L^1$. The other conductor $L^2$ is connected to the armature 169a of the relay through a flexible connection as shown. A condenser 191 is connected between the contacts 171 and 172 of the relay and is provided to effect a phase shift of approximately 90° in the alternating current flowing through one motor winding 189 or 190 relatively to alternating current flowing through the other winding when the relay armature 169a is in engagement with one or the other of the contacts 171 and 172. The effect of such shift in phase of the energizing current in one motor winding with respect to that in the other is to produce a rotating field in the motor in one direction or the oher and thereby rotation of the rotating element or rotor 192 of the motor 188 in a corresponding direction. Thus, when the relay armature 169a is in engagement with the contact 171 the rotor 192 will rotate in one direction and when the armature 169a is in engagement with the contact 172 the rotor will rotate in the opposite direction. Rotor 192 of the motor 188 is connected through suitable gearing or other means to the contact 184 of the bridge circuit 179 and is adapted to vary the position of the contact 184 along the length of the slide wire resistance 180 to vary the state of balance of the bridge circuit 179.

The relay 170 is arranged to selectively control the rotation of the reversible electrical motor 178. To this end the contacts 174 and 175 are connected to one end of a respective winding 193 and 194, the other ends of which are connected together and to the alternating current supply conductor $L^1$. The relay armature 173 is connected through a flexible conductor to the supply conductor $L^2$. The motor 178 may be exactly like the motor 188 and is provided with a condenser 195 for effecting a phase shift of approximately 90° in the alternating current flow through one motor winding 193 or 194 with respect to that in the other winding when the relay armature 173 is in engagement with one or the other of the contacts 174 and 175 respectively. As in the case with the motor 188, the effect of such a shift in phase of the energizing current in one motor winding with respect to that in the other is to produce a rotating field in the motor in one direction or the other and thereby rotation of the rotor 196 of the motor 178 in a corresponding direction.

Rotor 196 is connected through suitable gearing or other means to the operating stem of the valve 177 which is inserted in the fuel supply pipe 176 leading to the heating region of the furnace 2. Rotor 196 is also connected in any convenient manner to the contact 185 of the bridge circuit 179 and is adapted to adjust the contact 185 along the length of the slide wire resistance 181. The operation of the motor 178 is so arranged that such adjustments of the contact 185 along resistance 181 are in the direction to rebalance the bridge network 179 upon unbalance thereof.

When a suitably quick operating switching device 14 is utilized, it will be recognized that the electronic device 1 will measure the unbalance of the potentiometric network and the unbalance of the bridge network in rapid alternation and will regulate the current flow through the relay 169 in accordance with the state of balance of the potentiometric network and will regulate current flow through the relay 170 in accordance with the state of balance of the bridge network. Such regulation of the current through the relays 169 and 170 will for all practical purposes be continuous and simultaneous, and consequently, the adjustments of the fuel valve 177 will vary correspondingly with the variations in the electromotive force produced by the thermocouple 4 within the furnace 2.

Figure 9:
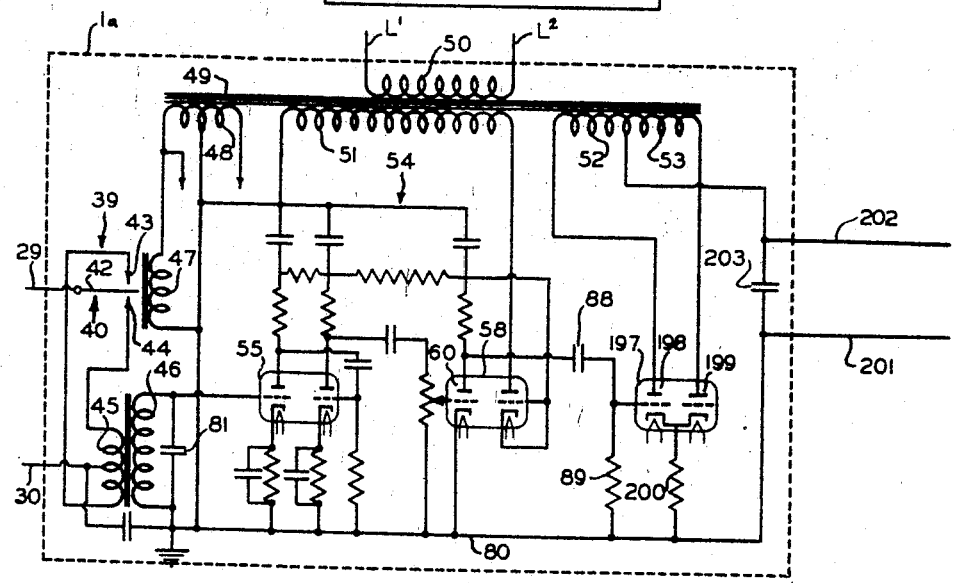
Fig. 9 illustrates in detail a preferred form of electronic device which may be utilized in the arrangement of Fig. 8.

In Fig. 8 I have illustrated another embodiment of the invention which is adapted to effect so-called "proportioning" control of the supply of heating medium to the furnace 2 upon variations in the temperature within the latter. In Fig. 8 also, the relays 169 and 170 of Fig. 7 have been dispensed with. To accomplish this result an electronic device 1a as is shown in detail in Fig. 9 is utilized in lieu of the electronic device 1 of Fig. 1.

The electronic device 1a may be exactly like the electronic device 1 shown in detail in Fig. 2 in respect to the type of converter 39 employed and in respect to the type of amplifier 54 utilized. The reconverter 99 of the electronic device 1 is not utilized in the electronic device 1a, however, and in the electronic device 1a the output circuit of the amplifier 54 is impressed on the input circuit of an electronic valve 197. The electronic valve 197 includes two triodes within the same envelope. These triodes have been designated by the reference characters 198 and 199 and each includes anode, control electrode, cathode and heater filament elements. The heater filament elements of the triodes 198 and 199 may desirably be connected in parallel with each other and with the heater filaments of the valves 55 and 58 to the terminals of the transformer secondary winding 48.

The output circuit of the amplifier 54, and more specifically, the output circuit of the triode 60 is resistance capacity coupled to the input circuits of the triodes 198 and 199 which input circuits are connected in parallel.

The output circuit of the triode 198 may be traced from the left end terminal of the transformer secondary winding 52 to the anode of the triode 198, the cathode thereof, through a cathode biasing resistance 200 to the grounded conductor 80 and also to a conductor 201 which comprises one output conductor of the electronic device 1a. The other output conductor of the electronic device 1a comprises a conductor 202 which is connected to the point of engagement of the transformer secondary windings 52 and 53. The output circuit of the triode 199 may be traced from the right end terminal of the transformer secondary winding 53 to the anode of the triode 199, the cathode thereof, and through the biasing resistance 200 to the conductor 201. A condenser 203, the purpose of which is hereinafter explained, is connected between the conductors 201 and 202.

When the signal impressed on the input circuits of the triodes 198 and 199 is zero, the current flowing in the output circuit of the triode 198 will be substantially the same as the current flowing through the output circuit of the triode 199. The transformer secondary windings 52 and 53 are so wound on the transformer 49 that the triodes 198 and 199 are alternately rendered conductive. Thus, when the triodes 198 and 199 are equally conductive the flow of current through the output conductors 201 and 202 of the electronic device 1a will be a substantially steady direct current.

The switching device 14 in Fig. 8 operates to alternately connect the conductors 201 and 202 of the electronic device 1a to the terminals of one phase winding 204 of a two phase rotating field motor 205 and to the terminals of one phase winding 206 of a rotating field motor 207. The motor 205 is provided with a second phase winding 208 which is connected through a condenser 209 of suitable value to the supply conductors $L^1$ and $L^2$. Similarly, the motor 207 is provided with a second phase winding 210 which is connected through a condenser 211 of suitable value to the supply conductors $L^1$ and $L^2$.

The electrical circuit shown in Figs. 8 and 9 of the drawings for controlling the operation of a reversible rotating field motor for rotation in one direction or the other is disclosed and is being claimed in patent application Serial No. 421,173, filed by W. P. Wills, for Measuring apparatus, on December 1, 1941, which issued as Patent No. 2,423,540 on July 8, 1947. Therefore, for the present purposes it is believed sufficient to note that the motors 205 and 207 are preferably so constructed that the impedance of the winding 204 of motor 205 and the impedance of the winding 206 of motor 207 are of the proper value to match the impedance of the output circuits of the triodes 198 and 199 when the motors are operating in order to obtain the most efficient operation. Preferably the motors are so constructed that the windings 204 and 206 have a high ratio of inductance to resistance, for example, a ratio of 6-1 or 8-1 at the frequency of the energizing current supplied to them. This provides for maximum power during the running condition of the motor with the least amount of heating and also provides a low impedance path for breaking purposes.

As noted hereinbefore, energizing current is supplied to the motor windings 208 and 210 from the alternating current supply conductors $L^1$ and $L^2$ through condensers 209 and 211, respectively. The condensers 209 and 211 are so selected with respect to the impedance of their respectively associated motor windings 208 and 210 as to provide a series resonant circuit having a unity power factor. Due to the series resonant circuit the total impedance of the motor winding 208 and of the motor winding 210 is substantially equal to the resistance of these windings and since this resistance is relatively low a large current flow through the windings 208 and 210 is made possible. This permits the attainment of maximum power and torque from the motors 205 and 207. In addition the current flow through the motor windings 208 and 210 is in phase with the voltage of supply conductors $L^1$ and $L^2$ because of the series resonant circuits. The voltages across motor windings 208 and 210 lead the currents through these windings by substantially 90°, however, because of the inductance of these motor windings.

Energizing current is alternately supplied the motor windings 204 and 206 from the transformer secondary windings 52 and 53 through the anode circuits of the triodes 198 and 199. The condenser 203 connected between the conductors 201 and 202 of the electronic device 1a is so chosen as to provide a parallel resonant circuit with each of the motor windings 204 and 206 having unity power factor. This parallel circuit in each case presents a relatively high external impedance and a relatively low local impedance. The relatively high external impedance is approximately the same as the impedance of the anode circuits of the triodes 198 and 199, and thereby provides efficient operation. The relatively low local or internal circuit impedance approximates the actual resistance of the windings 204 and 206, and since this resistance is relatively low, the impedance of the local circuit is also relatively low.

The motor 205 is provided with a rotor 212 which is connected through suitable gearing or in any other convenient manner to the contact 184 of the bridge network 179 and is adapted to adjust the contact 184 along the slide wire resistance 180 to regulate the state of balance of the bridge network. The rotor 212 is also coupled in any suitable manner to the contact 159 which is adjustable along the length of the resistance 156 and operates to effect such adjustments as necessary to restore the potentiometric network to its balanced condition wherever the latter is unbalanced as a result of a change in the electromotive force produced by the thermocouple 4. In this manner the adjustments given the contact 184 along the resistance 180 of the bridge network 179 correspond exactly to the extent to which the potentiometric network has been unbalanced by the change in electromotive force of the thermocouple 4.

The motor 207 is provided with a rotor 213 which is coupled by suitable gearing to the operating shaft of the valve 177 in the fuel supply pipe 176 to the furnace 2 and is also coupled in any suitable manner to the contact 185 of the bridge network 179. The motor 207 is so arranged as to effect adjustments of the contact 185 along the slide wire resistance 181 in the proper direction to restore the bridge network 179 to its balanced condition when the latter is unbalanced as a result of the contact 184 being adjusted along the resistance 180. Consequently, the adjustments given the fuel valve 177 by motor 207 will be in direct proportion to the change in electromotive force produced by the thermocouple 4 following a change in temperature within the interior of the furnace 2.

Figure 10:
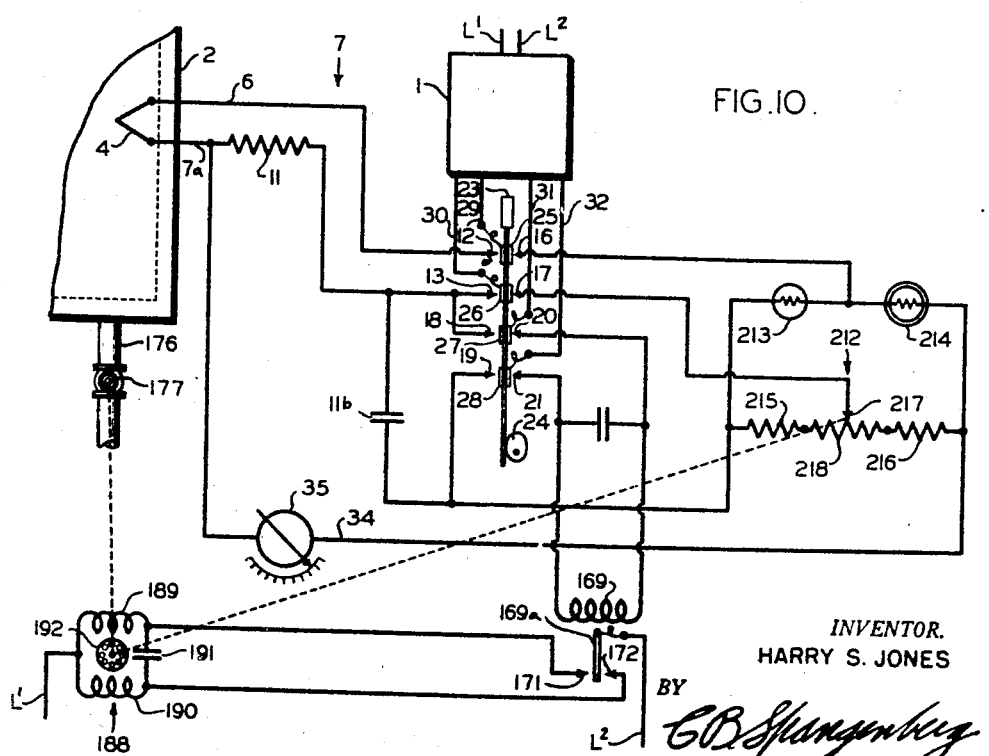
Fig. 10 illustrates a modification of Fig. 8.

In Fig. 10 I have illustrated another embodiment of my invention in which the supply of fuel to the furnace 2 may be varied, just as it is in the arrangement of Fig. 8, in proportional accordance with the voltage changes in a thermocouple 4. In the arrangement of Fig. 10, however, only a single reversible electrical motor is required in order to produce the desired proportioning adjustments of the fuel valve.

In Fig. 10 the unbalanced potential difference between the electromotive force produced by a thermocouple 4 and the potential drop across a resistance 11 is periodically impressed on the input circuit of an electronic device 1 which may be identical to the corresponding identified part of Figs. 1 and 2. Simultaneously, the output circuit of the electronic device 1 is connected to a circuit including the resistance 11 and an indicating instrument 35 and a bridge circuit 212, all of which elements are connected in series in the output circuit of the device 1.

The bridge network 212 includes resistances 213 and 214 in two separate arms and resistances 215 and 216 in its remaining arms. The point of engagement of the resistances 213 and 214 comprises one equalizing or balancing terminal of the bridge 212 and the point of engagement of a contact 217 along the resistance 218, the latter of which is connected between the resistances 215 and 216 comprises the other equalizing or balancing terminal of the bridge network. One energizing terminal of the bridge network is the point of engagement of the resistances 213 and 215 and the other energizing terminal is the point of engagement of the resistances 214 and 216. The energizing terminals of the bridge network 212 are connected in the output circuit of the device 1 in series with the resistance 11 and the instrument 35.

The balancing terminal of the bridge network 212 comprising the point of engagement of resistances 213 and 214 is connected to the contact 16 of a switching device 14 which may be identical to the correspondingly identified part of Fig. 1 and the bridge balancing terminal comprising the contact 217 is connected to the contact 17 of the switching device 14. Thus, the balancing terminals of the bridge network 212 are arranged to be periodically connected to the input circuit of the electronic device 1, the connection of the balancing terminals of the bridge network to the input circuit of device 1 alternating with the connection of the output terminals of potentiometric network 7 thereto. During the intervals when the bridge balancing terminals are connected to the input circuit of the device 1, the output circuit of the device 1 is connected to the terminals of a relay 169 which may be identical to the corresponding identified part of Figs. 6 and 7. The relay 169 operates to selectively control the rotation and direction of rotation of a reversible electrical motor 188 in the manner described in connection with Fig. 7. The rotor of reversible motor 188 is operatively connected to the valve 177 for producing the desired opening and closing adjustments of the latter and is also connected to the bridge contact 217 for effecting adjustments of that contact along the length of the slide wire resistance 218 as are required to rebalance the bridge network 212 upon unbalance thereof.

The resistance 213 is composed of material having a negligible or insignificant temperature coefficient of resistance such as manganin, and therefore, its resistance remains substantially constant over a wide range of variation in temperature thereof. The resistance 214 of bridge network 212 is of the type which varies in resistance with changes in temperature thereof and, for example, may comprise the filament of a tungsten or a carbon lamp. Such resistances have an appreciable temperature coefficient of resistance. Tungsten filaments have a positive temperature coefficient of resistance while carbon filaments have a negative coefficient of resistance. If desired, the resistance 214 may also be composed of the material known and sold commercially under the trade name Thermistors by the Western Electric Company. The voltage drop through the bridge resistances 213, 215, 216 and 218 bear a straight line relationship to the current flow through these resistances but no such straight line relationship obtains for the resistance 214 because as the current flow through this resistance is increased the temperature of the resistance is raised and because of the temperature coefficient of resistance of the resistance the voltage drop across it increases at a different rate than does the current.

The values of the resistance elements of bridge network 212 are so chosen that when the current flow to the bridge network 212 from the output circuit of the electronic device 1 is a predetermined value the potential drop across resistance 213 will be the same as that across resistance 214 and the balancing or equalizing terminals of the bridge will then be at the same potential when the contact 217 is at a center position along the length of resistance 218. Upon variation in the current flow in the output circuit of electronic device 1 and thus to the bridge network 212, the bridge will be unbalanced in one direction or the other to an extent corresponding to the magnitude of the change in current flow. A condenser 11b is connected between the contacts 18 and 19 of the switching device 14 for smoothing out the pulsations in current flow to resistance 11, instrument 35 and bridge 212 from the output terminals of electronic device 1. By virtue of the action of condenser 11b, a substantially steady direct current potential of a magnitude corresponding to the magnitude of the bridge energizing current change and of one polarity or of opposite polarity depending upon the direction of the current change will be produced between the balancing terminals of the bridge network. The condenser 11b operates also to smooth out the current flow through resistance 11 and instrument 35. This direct current potential is impressed on the input circuit of the electronic device 1 during intervals alternating with intervals during which the potential derived in the network 7 is impressed on the input circuit of the device 1. Since the relay 169 is connected to the output circuit of the device 1 during the intervals that the balancing terminals of the bridge network 212 are connected to the input circuit, the current flow through the relay 169 will vary in accordance with the variations in potential between the bridge network balancing terminals. Consequently, the reversible electrical motor 188 will be selectively controlled for rotation in one direction or the other depending upon the direction of unbalance of the bridge network 212 which is effected as a result of unbalance of the bridge network 7.

The motor 188 is operatively connected to the fuel valve 177 and to the bridge rebalancing contact 217. Thus, when the motor 188 is energized for rotation the motor effects an adjusting movement of the contact 217 along the slide wire resistance 218 to rebalance the bridge network 212 and effects a corresponding adjustment of the fuel valve 177. The bridge network 212 will then be rebalanced and the motor rotor will come to rest at a new position along the slide wire resistance 218 corresponding to the electromotive force then being produced by the thermocouple 4 and thus to the temperature within the furnace 2. A measure of the furnace temperature is provided by the instrument 35.

Figure 11:
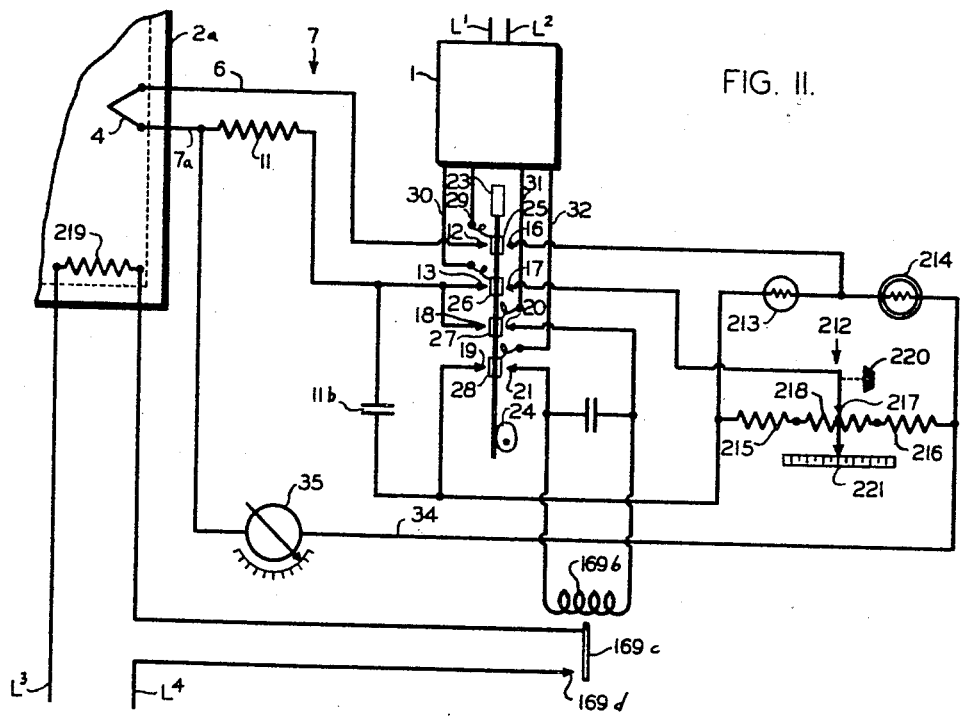
Fig. 11 illustrates a modification of the arrangement of Fig. 10.

In Fig. 11 I have illustrated a modification of the arrangement of Fig. 10 which may be employed for effecting so-called on-off control of the temperature within a furnace 2a. The arrangement of Fig. 11 is exactly like that of Fig. 10 except that the reversible electrical motor 188 has been eliminated and that the furnace 2a is an electric furnace having a heating resistor 219 to which energizing current is supplied from electric current supply lines L³ and L⁴ under control of a relay 169b. The relay 169b is arranged to be connected to the output circuit of the electronic device 1 during the intervals that the balancing terminals of the bridge network 212 are connected to the input circuit of the device 1 and is provided with an armature 169c and a contact 169d. The armature 169c moves into engagement with contact 169d upon increase in the current flow through relay 169b above a predetermined value to close the energizing circuit to the furnace heating resistor 219 and vice versa operates upon decrease in that current flow below said predetermined value to open the circuit at armature 169c and thereby to deenergize the furnace heating resistance 219.

In Fig. 11 the position of contact 217 along the length of slidewire resistance 218 may be adjusted by means of the manipulation of a knob 220 to set the control point of the apparatus at the desired value or, in other words, the temperature it is desired that the apparatus maintain in the interior of the furnace 2a. A suitably calibrated scale 221 is provided in cooperative relation with the contact 217 and knob 220 for facilitating this adjustment.

Subject matter disclosed in this application but not claimed herein is disclosed and is being claimed in a copending application S. N. 474,994, filed on February 6, 1943, by Henry N. Schmitt, which issued as Patent No. 2,427,881 on September 23, 1947, and in a copending application S. N. 474,965, filed on February 6, 1943, by Walter P. Wills, which issued as Patent No. 2,376,527 on May 22, 1945. Other subject matter disclosed but not claimed herein is disclosed and is being claimed in my copending application S. N. 446,831, filed June 12, 1942, and issued into Patent 2,315,714 on April 6, 1943.

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. Apparatus for measuring the magnitudes of a plurality of variable conditions continuously and simultaneously including an electric potential producing device associated with each of said conditions and operative to produce an electric potential varying in accordance with the variations in magnitude of the condition individual thereto, an electrical device common to all of said electric potential producing devices and operative to determine the magnitude of said electric potentials, said electrical device having an input circuit and an output circuit, measuring means responsive to the current flow in the output circuit of said electrical device and adapted to be conditioned to distinguish between the measurements of each of said variable conditions, and means to successively connect each of said electric potential producing devices to the input circuit of said electrical device at a rate faster than the period of response of said measuring means and to condition said measuring means as required to distinguish between the measurements of each of said variable conditions.

2. The combination of claim 1 wherein each of said variable conditions is a temperature condition and each of said electric potential producing devices comprises a thermoelectric device.

3. Apparatus for measuring the magnitude of a plurality of variable conditions continuously and simultaneously including an electric potential producing device associated with each of said conditions and operative to produce an electric potential varying in accordance with the variations in magnitude of the condition individual thereto, an electronic device common to all of said electric potential producing devices and operative to measure the magnitude of said electric potentials, said electronic device having an input circuit and an output circuit, measuring means responsive to the current flow in the output circuit of said electronic device, and means to successively connect each of said electric potential producing devices to the input circuit of said electronic device at a rate faster than the period of response of said measuring means and to condition said measuring means to distinguish between the measurements of each of said electric potentials.

4. Apparatus for measuring the magnitude of a plurality of variable conditions including a unidirectional electric potential producing device associated with each of said conditions and operative to produce an electric potential varying in accordance with the variations in magnitude of the condition individual thereto, an electronic device common to all of said electric potential producing devices and operative to determine the magnitudes of said electric potentials, said electronic device having an input circuit and an output circuit and including means in the input part thereof to convert the unidirectional potential produced by said potential producing devices into an alternating current, means to amplify said alternating current and means in the output part thereof to reconvert the amplified alternating current into a unidirectional current, measuring means responsive to the current flow in the output circuit of said electronic device, and means to successively connect each of said electric potential producing devices to the input circuit of said electronic device at a rate faster than the period of response of said measuring means and to condition said measuring means to distinguish between the measurements of each of said electric potentials.

5. The combination of claim 4 wherein each of said variable conditions is a temperature condition and each of said electric potential producing devices comprises a thermocouple.

6. Apparatus for measuring the magnitude of a plurality of variable conditions continuously and simultaneously including a unidirectional electric potential producing device associated with each of said conditions and operative to produce an electric potential varying in accordance with the variations in magnitude of the condition individual thereto, an electronic device common to all of said electric potential producing devices and operative to determine the magnitudes of said electric potentials, said electronic device having an input circuit and an output circuit and including means in the input part thereof to convert the unidirectional potentials produced by said potential producing devices into an alternating current, means to amplify said alternating current and means in the output part thereof to reconvert the amplified alternating current into a unidirectional current, a device individual to each of said potential producing devices and responsive to the unidirectional current flow in the output circuit of said electronic device, and means to successively connect each of said electric potential producing devices to the input circuit of said electronic device and each of said responsive devices to the output thereof at a rate faster than the period of response of the responsive devices.

7. Apparatus for measuring the magnitudes of a plurality of variable conditions continuously and simultaneously including an electric potential producing device associated with each of said conditions and operative to produce an electric potential varying in accordance with the variations in magnitude of the condition individual thereto, an electronic device common to all of said electric potential producing devices and operative to measure the magnitudes of said electric potentials, said electronic device having an input circuit and an output circuit, a device individual to each of said potential producing devices and responsive to the current flow in the output circuit of said electronic device, and means to successively connect each of said electric potential producing devices to the input circuit of said electronic device and each of said responsive devices to the output circuit thereof at a rate faster than the period of response of the responsive devices.

8. Apparatus for measuring the magnitudes of a plurality of variable conditions continuously and simultaneously including an electric potential producing device associated with each of said conditions and operative to produce an electric potential varying in accordance with the variations in magnitude of the condition individual thereto, an electronic device common to all of said electric potential producing devices and operative to measure the magnitudes of said electric potentials, said electronic device having an input circuit and an output circuit, an electric current indicating device individual to each of said potential producing devices and responsive to the current flow in the output circuit of said electronic device, and means to successively connect each of said electric potential producing devices to the input circuit of said electronic device and to successively connect each of said responsive devices to the output circuit thereof at a rate faster than the period of response of the responsive devices.

9. Apparatus for measuring the magnitudes of a plurality of variable conditions continuously and simultaneously including an electric potential producing device associated with each of said conditions and operative to produce an electric potential varying in accordance with the variations in magnitude of the condition individual thereto, an electronic device common to all of said electric potential producing devices and having an input circuit and an output circuit, a resistance individual to each of said electric potential producing devices and adapted to be separately connected in the output circuit of said electronic device, the current flow through each of said resistances from the output circuit of said electronic device operating to produce a potential drop thereacross, an electric current responsive device individual to each of said potential producing devices and to each of said resistances and adapted to be separately connected in the output circuit of said electronic device, and means to successively connect each of the associated resistances and current responsive devices to the output circuit of said electronic device and the associated resistances and electric potential producing devices to the input circuit of said electronic device in such manner that the potential drop across said resistance is opposed to the potential produced by its associated potential producing device.

10. Apparatus for measuring the magnitudes of a plurality of variable conditions continuously and simultaneously including an electric potential producing device associated with each of said conditions and operative to produce an electric potential varying in accordance with the variations in magnitude of the condition individual thereto, an electronic device common to all of said electric potential producing devices and having an input circuit and an output circuit, a resistance individual to each of said electric potential producing devices and adapted to be separately connected in the output circuit of said electronic device, the current flow through each of said resistances from the output circuit of said electronic device operating to produce a potential drop thereacross, an electric current indicating device individual to each of said potential producing devices and to each of said resistances and adapted to be separately connected in the output circuit of said electronic device, and a switching device to successively connect each of the associated resistances and current indicating devices to the output circuit of said electronic device and the associated resistances and electric potential producing devices to the input circuit of said electronic device at a rate faster than the period of response of said indicating devices and in such manner that the potential drop across said resistance is opposed to the potential produced by its associated potential producing device.

11. Apparatus for controlling the magnitude of a variable condition including an electric potential producing device associated with said condition and operative to produce an electric potential varying in characteristic in accordance with the variations in magnitude of said condition, means to regulate said condition, an electrical device having an input circuit and an output circuit, an electrical network adapted to be unbalanced to produce an electric potential variable in characteristic, means responsive to the current flow in the output circuit of said electrical device to control said first mentioned means, and means to intermittently control the input circuit of said electrical device by said first mentioned potential and to apply the current flow in the output circuit of said electrical device to control the state of balance of said network and during intervening periods to control the input circuit of said electrical device by said second mentioned potential and to apply the current flow in the output circuit of said electrical device to control said control means.

12. Apparatus for controlling the magnitude of a variable condition including an electric potential producing device associated with said condition and operative to produce an electric potential varying in characteristic in accordance with the variations in magnitude of said condition, means to regulate said condition, an electronic device having an input circuit and an output circuit, an electrical bridge network adapted to be unbalanced to produce an electric potential variable in characteristic, means responsive to the current flow in the output circuit of said electronic device to control said regulating means, and means to intermittently control the input circuit of said electronic device by said first mentioned potential and to apply the current flow in the output circuit of said electronic device to control the state of balance of said bridge network and during intervening periods to control the input circuit of said electronic device by said second mentioned potential and to apply the current flow in the output circuit of said electronic device to control said control means.

13. Apparatus for controlling the magnitude of a variable condition including an electric potential producing device associated with said condition and operative to produce an electric potential varying in characteristic in accordance with the variations in magnitude of said condition, means to regulate said condition, a normally balanced electrical network adapted to be unbalanced in one sense or in the opposite sense to produce an electric potential in the output circuit thereof which is variable in characteristic, an electrical device having an input circuit and an output circuit and operative to respond to the characteristic of both of said potentials, means to unbalance said network, means to rebalance said network and to control said first mentioned means, and means to intermittently connect said electric potential producing device and said network unbalancing means to the input and output circuits, respectively, of said electrical device and during intervening periods to connect the output circuit of said network and said network rebalancing means to the input and output circuits, respectively, of said electrical device.

14. Apparatus for controlling the magnitude of a variable condition including an electric potential producing device associated with said condition and operative to produce an electric potential varying in magnitude in accordance with the variations in magnitude of said condition, a source of potential of known magnitude, means to oppose said first mentioned potential to said second mentioned potential to derive a differential potential, means to regulate said condition, a balanced electrical network adapted to be unbalanced in one sense or in the opposite sense to produce an electric potential in the output circuit thereof which is variable in characteristic, an electronic device having an input circuit and an output circuit and operative to respond to variations in said differential potential and in the potential produced by said electrical network, means to unbalance said network and to vary the magnitude of said known potential to reduce said differential potential, means to rebalance said network and to control said first mentioned means, and means to intermittently connect said differential potential and said network unbalancing means to the input and output circuits respectively, of said electronic device and during intervening periods to connect the potential produced by the network and said network rebalancing means to the input and output circuits respectively of said electronic device.

15. The combination of claim 14 wherein the variable condition controlled is a temperature condition and said electric potential producing device comprises a thermocouple and said known potential in a unidirectional potential, wherein said electronic device includes means to convert the undirectional differential potential produced by opposing said two first mentioned potentials into an alternating current and means to amplify said alternating current, wherein the means for unbalancing said network and for varying said known potential comprises a two phase reversible electrical motor one phase of which is energized by the alternating current output of said electronic device and the other phase of which is energized by a source of alternating current.

16. Apparatus for controlling the magnitude of a variable condition including an electric potential producing device associated with said condition and operative to produce an electric potential varying in accordance with the variations in magnitude of said condition, means for regulating said condition, an electrical device having an input circuit and an output circuit, an electrical network responsive to the current flow in the output circuit of said electrical device and operative to produce an electric potential variable in characteristic upon variation in the output current of said electrical device, separate means responsive to the output current of said electrical device to control said first mentioned means, and means to intermittently control the input of said electrical device by said first mentioned potential and to apply the current flow in the output circuit of said electrical device to said electrical network and during intervening periods to control the input circuit of said electrical device by the potential produced by said electrical network and to apply the current flow in the output circuit of said electrical device to control said control means.

17. Apparatus for controlling the magnitude of a variable condition including an electric potential producing device associated with said condition and operative to produce an electric potential varying in magnitude in accordance with the variations in magnitude of said condition, means to regulate said condition, an electrical device having an input circuit and an output circuit, a resistance through which the current in the output circuit of said electrical device is adapted to flow to produce a potential drop across said resistance, means connecting said electric potential producing device and said resistance in circuit to oppose the potential drop across said resistance to the potential produced by said device to derive a differential potential, an electrical network responsive to the current flow in the output circuit of said electrical device and adapted to be unbalanced upon variation in said output current flow to produce an electric potential variable in characteristic, separate means responsive to the current flow in the output circuit of said electrical device to control said first mentioned means and to rebalance said electrical network, and means to intermittently control the input circuit of said electrical device by said differential potential and to apply the current flow in the output circuit of said electrical device to control the balance of said network and during intervening periods to control the input circuit of said electrical device by the potential produced by said network and to apply the current flow in the output circuit of the said electrical device to control said control means to regulate said condition and to rebalance said electrical network.

18. The combination of claim 17 wherein said electrical network includes an electrical bridge circuit in one arm of which a resistance having an appreciable temperature coefficient of resistance is connected and in an opposite arm of which a resistance having a negligible temperature coefficient of resistance is connected.

19. Apparatus responsive to changes in the magnitudes of a plurality of variable conditions continuously and simultaneously including an electric potential producing device associated with each of said conditions and operative to produce an electric potential varying in accordance with the variations in magnitude of the condition individual thereto, an electrical device common to all of said electric potential producing devices and operative to determine the magnitude of said electric potentials, said electrical device having an input circuit and an output circuit, means responsive to the current flow in the output circuit of said electrical device and adapted to be conditioned to distinguish between the response during different intervals, and means to successively connect each of said electrical potential producing devices to the input circuit of said electrical device at a rate faster than the period of response of said responsive means and to condition said responsive means to distinguish between the response to each of said electric potentials.

20. Apparatus responsive to the magnitudes of a plurality of variable conditions continuously and simultaneously including an electric potential producing device associated with each of said conditions and operative to produce an electric potential varying in accordance with the variations in magnitude of the condition individual thereto, an electronic device common to all of said electric potential producing devices and operative to determine the magnitude of said electric potentials, said electronic device having an input circuit and an output circuit, means responsive to the current flow in the output circuit of said electronic device and adapted to be conditioned to distinguish between the response during different intervals, and means to successively connect each of said electrical potential producing devices to the input circuit of said electronic device at a rate faster than the period of response of said responsive means and to condition said responsive means to distinguish between the response to each of said electric potentials.

21. Apparatus responsive to the magnitudes of a plurality of variable conditions including a unidirectional electric potential producing device associated with each of said conditions and operative to produce an electric potential varying in accordance with the variations in magnitude of the condition individual thereto, an electronic device common to all of said electric potential producing devices and operative to determine the magnitudes of said electric potentials, said electronic device having an input circuit and an output circuit and including means in the input part thereof to convert the unidirectional potential produced by said potential producing device into an alternating current, means to amplify said alternating current and means in the output part thereof to reconvert the amplified alternating current into a unidirectional current, means responsive to the current flow in the output circuit of said electronic device and adapted to be conditioned to distinguish between the response during different intervals, and means to successively connect each of said electric potential producing devices to the input circuit of said electronic device at a rate faster than the period of response of said responsive means and to condition said responsive means to distinguish between the response to each of said electric potentials.

22. Apparatus responsive to the magnitudes of a plurality of variable conditions continuously and simultaneously including a unidirectional electric potential producing device associated with each of said conditions and operative to produce an electric potential varying in accordance with the variations in magnitude of the condition individual thereto, an electrical device common to all of said electric potential producing devices and operative to determine the magnitudes of said electric potentials, said electrical device having an input circuit and an output circuit and including means in the input part thereof to convert the unidirectional potential produced by said potential producing device into an alternating current, means to amplify said alternating current and means in the output part thereof to reconvert the amplified alternating current into a unidirectional current, a device individual to each of said potential producing devices and responsive to the current flow in the output circuit of said electrical device, and means to successively connect each of said electric potential producing devices to the input circuit of said electrical device and each of said responsive devices to the output thereof at a rate faster than the period of response of the responsive devices.

HARRY S. JONES.

REFERENCES CITED

The following references are of record in the file of this patent:

UNITED STATES PATENTS

| Number | Name | Date |
| --- | --- | --- |
| 2,109,222 | Ryder | Feb. 22, 1938 |
| 2,315,714 | Jones | Apr. 6, 1943 |
| 2,150,006 | Parker et al. | Mar. 7, 1939 |
| 1,263,308 | Bristol | Apr. 16, 1918 |
| 2,047,984 | Riggs | July 21, 1936 |